United States Patent [19]

Asai et al.

[11] Patent Number: 5,389,493
[45] Date of Patent: Feb. 14, 1995

[54] DYE-RECEIVING RESIN FOR SUBLIMATION TRANSFER IMAGE RECEIVING MATERIAL AND IMAGE RECEIVING MATERIAL COMPRISING SAME

[75] Inventors: Haruo Asai; Mitsuru Kuwabara; Nobukazu Kotera; Hiroshi Fujimoto, all of Ohtsu, Japan

[73] Assignee: Toyo Boseki Kabushiki Kaisha, Japan

[21] Appl. No.: 201,621

[22] Filed: Feb. 25, 1994

Related U.S. Application Data

[63] Continuation of Ser. No. 955,864, Dec. 9, 1992, abandoned.

[30] Foreign Application Priority Data

| Feb. 15, 1991 | [JP] | Japan | 3-44147 |
| Aug. 30, 1991 | [JP] | Japan | 3-246912 |
| Oct. 9, 1991 | [JP] | Japan | 3-290537 |

[51] Int. Cl.$^6$ ............................... G03C 8/00
[52] U.S. Cl. ................... 430/211; 528/272; 528/298; 528/302; 528/303; 528/307; 528/308; 528/308.6; 430/199; 430/203; 430/222; 430/533; 430/535
[58] Field of Search ............... 528/272, 298, 302, 303, 528/307, 308, 308.6; 430/199, 203, 211, 222, 533, 535; 428/480, 481

[56] References Cited

U.S. PATENT DOCUMENTS 4,297,432  10/1981  Bowman et al. ............... 430/215
4,727,057  2/1988  Harrison et al. ............... 503/227

*Primary Examiner*—Samuel A. Acquah
*Attorney, Agent, or Firm*—Leydig, Voit & Mayer, Ltd.

[57] ABSTRACT

A dye-receiving resin for sublimation transfer image receiving materials, which mainly constitutes an image receiving layer of the sublimation transfer image receiving materials, said resin being a polyester resin comprising, as a main dicarboxylic acid component, an aromatic dicarboxylic acid component, and an alicyclic glycol component in glycol component, and an image receiving layer comprising said resin shows high dye-receiving sensitivity, is superior in durability and preservation stability of images transferred, and can provide high-quality sublimation transfer image receiving materials.

22 Claims, No Drawings

DYE-RECEIVING RESIN FOR SUBLIMATION TRANSFER IMAGE RECEIVING MATERIAL AND IMAGE RECEIVING MATERIAL COMPRISING SAME

This is a continuation of U.S. application Ser. No. 07/955,864, filed on Dec. 9, 1992, abandoned.

DETAILED DESCRIPTION OF THE INVENTION

1. Technical Field

The present invention relates to a dye-receiving resin For sublimation transfer image receiving material to be used in combination with thermal transfer sheet containing sublimable dye, and to an image receiving material comprising same.

2. Background Art

This method is conventionally intended for obtaining printed images by heating thermal dye transfer sheets applied with sublimable disperse dyes, by a thermal head, etc., and allowing said sublimable dyes to transfer to dye receiving papers to be brought into contact with the thermal dye transfer sheets.

As the dye-receiving resin used for the dye-receiving layer (image receiving layer) or the aforesaid sublimation transfer image receiving paper, conventionally known are those mainly containing saturated polyesters, as disclosed in Japanese Patent Unexamined Publication Nos. 107885/1982, 64899/1985, 258790/1986, and 105689/1987.

In this regard, when saturated polyester is used as a resin for dyeing, it affords high quality images superior in tone and color reproduction. Yet, it is not sufficient in preservation stability of images in terms of color density, and light-resistance heat stability, resistance to moisture, resistance to staining by fats and oils as represented by those of finger prints, and resistance to staining by plasticizers in erasers, vinyl chloride sheets, etc., of the recorded images. Particularly, a long-term preservation gives rise to problems of color change, turbulence of images, and so on.

DISCLOSURE OF THE INVENTION

In an attempt to solve the aforementioned problems, the present inventors have conducted intensive studies of dye-receiving resin which forms a dye-receiving layer of sublimation transfer image receiving materials, and found that the polyester resin to be described later is superior in light-resistance, heat stability, and preservation stability of printed images, which resulted in the completion of the invention. That is, a sublimation transfer image receiving material comprises a base material and a thereon-formed dye-receiving layer, and a dye-receiving resin mainly constituting the dye-receiving layer of the aforementioned sublimation transfer image receiving material is a polyester resin, said polyester resin comprising, as a main component of dicarboxylic acid component, an aromatic dicarboxylic acid, and an alicyclic glycol component in glycol component.

The aromatic carboxylic acid component which is the main component or dicarboxylic acid component of the polyester resin of the present invention is exemplified by terephthalic acid, isophthalic acid, orthophthalic acid, 2,3-naphthalic acid, 1,1,3-trimethyl-3-phenylindene-4', 5-dicarboxylic acid, sodium 5-sulfoisophthalic acid, naphthalene dicarboxylic acid, or the like. As usable dicarboxylic acids other than the aromatic dicarboxylic acids, exemplified are aromatic oxycarboxylic acids such as p-(hydroxyethoxy)benzoic acid, aliphatic dicarboxylic acids such as succinic acid, adipic acid, azelaic acid, sebaeic acid, and dodeeanoic dicarboxylic acid, unsaturated aliphatic or alicyclic dicarboxylic acids such as fumlaric acid, maleic acid, tetrahydrophthalic acid, and 1,4-cyclohexanedicarboxylic acid, and tri- and tetracarboxylic acids such as trimellitic acid, and pyromellitic acid. Of these acid components, the aromatic dicarboxylic acid is preferably contained in a proportion of not less than 60 mol %, more preferably not less titan 70 mol % in the entire acid components. Where, of the above-mentioned acid components, the aromatic dicarboxylic acid is less than 60 mol %, glass transition temperature of the resin becomes lower, thus resulting in blocking of coating. Of the aromatic dicarboxylic acids, the use of terephthalic acid and isophthalic acid in combination is preferable from the aspect of solubility in solvent.

The alicyclic glycol contained in the glycol component of the polyester resin of the present invention is a glycol having tricyclodecane skeleton or/and cyclohexane skeleton. The glycol having tricyclodecane skeleton is exemplified by tricyclodecanedimethylol, or/and its addition product with alkylene oxide. The glycol having cyclohexane skeleton is exemplified by 1,4-cyclohexanedimethanol, or/and its addition product with alkylene oxide. These alicyclic glycols can be used solely or in combination. Examples of the glycol component to be used in combination with the glycol component comprising alicyclic glycol are ethylene glycol, propylene glycol, neopentyl glycol, diethylene glycol, dipropylene glycol, polyethylene glycol, tripropylene glycol, 2, 3, 4-trimethylol-1,3-pentanediol, 1,6-hexanediol, addition product of bisphenol A with ethylene oxide, addition product of hydrogenated bisphenol A with ethylene oxide and/or propylene oxide, 2,2-diethyl-1,3-propanediol, 2-n-butyl-2-ethyl-1, 3-propanediol, and the like. Of these, preferred are neopentyl glycol, ethylene glycol, polyethylene glycol, and addition product of bisphenol A with ethylene oxide.

Besides glycol component, a small amount of polyhydric alcohol such as trimethylolpropane, trimethylolethane, glycerine, etc. may be copolymerized to the extent that it is not detrimental to the properties of the polyester resin of the present invention.

It is essential that the polyester resin of the present invention contain an alicyclic glycol in the glycol component, preferably in a proportion of not less than 20 mol %. Where the content of the aforesaid glycol is less than 20 mol %, durability of images tends to become poor.

The number average molecular weight of the polyester resin of the present invention is preferably 1,000–100,000, more preferably 2,000–50,000. Where the molecular weight is less than 1,000, the strength of dye-receiving layer coating becomes lower, whereas it is more than 100,000, the solution viscosity becomes undesirably too high to handle easily.

The glass transition temperature of the polyester resin of the present invention is preferably between 40° C. and 120° C. Where it is less than 40° C., blocking and blurring of images easily occur, and where it is higher than 120° C., transfer failure tends to occur.

The specific gravity of the polyester resin of the present invention is preferably between 1.15 and 1.50, more preferably between 1.20 and 1.40. Too low a specific gravity results in poor image durability, and too high a specific gravity can easily cause dyeing failure.

In some cases, the polyester resin of the present invention may be used upon modification of the molecule chain terminal hydroxyl group or carboxyl group by reaction thereof with compounds capable of reacting with these groups, such as acid anhydrides.

In the present invention, resin(s) other than the polyester resin of the present invention may be also mixed. The resin to be mixed may be, but not limited to, polyvinyl resins, polycarbonate resins, polyacrylic acid resins, polymethacrylic acid resins, polyolefin resins, cellulose derivative resins, polyether resins, and polyester resins. The polyester resin of the present invention may be thermoset or crosslinked so as to improve durability of images. Examples of the thermosetting resin concurrently used with a crosslinking agent include silicone resin, melamine resin, phenol-formaldehyde resin, epoxy resin, isocyanate resin, and so on. The crosslinking can be performed by condensation reaction, addition reaction, ionic crosslinking, radiation crosslinking, and so on. In the present invention, various lubricants may be added to the polyester resin for improving releasability from thermal dye transfer sheet.

Such lubricants include fluororesins, silicone resins, and surface lubricants such as organic sulfonate compounds, organic phosphate compounds, and organic carboxylate compounds.

Also, ultraviolet absorbers, antioxidants, dyeing sensitizers, and so on may be added to the polyester resin of the present invention for improving light-resistance of recorded images.

While no limitation is imposed on the base material to be used as a receiving material for sublimation transfer images, usable are paper, synthetic paper, various films, various sheets, and so on.

The method for coating the polyester resin of the present invention generally comprises dissolving said polyester resin in a solvent for use, or using the polyester resin in a form of non-aqueous dispersion, aqueous dispersion or aqueous solution (without solvent). The solid content is normally 5–70% by weight.

BEST MODE FOR CARRYING OUT THE INVENTION

The present invention is hereinbelow detailedly described by way of production examples and examples, wherein a mere "part" means "part by weight", and "%" means "% by weight".

The number average molecular weight of the polymers produced was determined by GPC, the polymer composition was identified by $^1$H-NMR, and the glass transition temperature was measured by DSC, the results of which are summarized in Table 1.

Dyeing concentration, light-resistance, and heat resistance were determined by the methods given below. The determination results are shown in Table 2.

(1) Production of polyester resins

In an autoclave equipped with a thermometer and a stirrer were charged 243 parts of dimethyl terephthalate, 243 parts of dimethyl isophthalate, 245 parts of tricyclodecanedimethylol (TCD-Alkohol DM, manufactured by Hoechst), 264 parts of ethylene glycol, and 0.5 part of tetrabutoxytitanate, and the mixture was heated at 150°–220° C. for 240 minutes for transesterification, after which the reaction system was heated to 250° C. over 30 minutes. The pressure of the system was gradually reduced to not more than 0.3 mmHg in 45 minutes, under which condition the reaction was continued further for 75 minutes to give pale yellow transparent polyester resin A. The number average molecular weight of the resin obtained was 21,000. Polyesters B-K obtained by the similar production method are shown in Table 1.

(2) Evaluation of density of printed images

An image receiving sheet and a thermal dye transfer sheet were respectively superposed so that the dye-receiving layer (dye receptor layer) of the image receiving material and a coloring material layer of the thermal dye transfer sheet were brought into contact. The thermal dye transfer sheet was heated from the base material side thereof using a thermal head (0.7 W/dot head output, 8 ms head heating time, 3 dots/mm dot density) to allow the cyan dye in the coloring material layer to transfer to the dye-receiving layer. The density of the transferred images thus obtained was determined by reflection densitometer (DM-600, manufactured by Dainippon Screen Co., Ltd.).

(3) Evaluation of light-resistance

The image receiving sheet to which cyan dye had been transferred was exposed to a xenon lamp at 40° C. so that the energy given thereby was 67.0 KJ/m$^2$, and dye density retention (%) was estimated from the comparison of the image densities before and after the light-resistance test.

$$\text{Dye density retention (\%)} = \frac{\text{Density after light-resistance test}}{\text{Density before light-resistance test}} \times 100$$

(4) Evaluation of heat resistance (percent color fading)

An image receiving sheet to which cyan dye had been transferred was left standing in a dark place at 60° C. for 168 hours for aging, and dye density retention (%) was estimated from the comparison with the image density before the heat-resistance test.

(5) Evaluation of resistance to plasticizer

An 80 μm-thick vinyl chloride film (1 cm$^2$) was adhered onto the surface of an image receiving sheet to which cyan dye had been transferred, and a 5 g-load was applied on the vinyl chloride film, after which it was left standing at 40° C. for 24 hours. Decoloring of the cyan dye and trace of the film were examined. Those showing no trace of the film on the surface of the image receiving sheet nor any change such as deeoloring after the aging were expressed by , those showing no color change but showing trace of the film after the aging were expressed by Δ, and those showing both color change and trace of the film after the aging were expressed by ×.

(6) Evaluation of resistance to finger print

Thumb was pressed hard against the surface of the image receiving sheet to which cyan dye had been transferred to leave the finger print on the surface of the images. The sheet was left standing at 40° C. for 48 hours, and agglomeration of cyan dye, decoloring, and trace of the finger print were examined. Those showing no trace of the finger print on the surface of the image receiving layer nor color change after the aging were expressed by , those showing no color change but showing trace of the finger print after the aging were expressed by Δ, and those showing agglomeration of the dye on the image surfaces after the aging were expressed by ×.

(7) Evaluation of image preservation stability

An image receiving sheet to which cyan dye had been transferred was left standing in a dark place at 50° C. for a week for aging.

After the aging, printed dots were examined with a 40×magnification magnifying glass, and those showing apparent blurring due to the diffusion of the dye between printed dots were expressed by ×, and those permitting confirmation of printed dots in the same manner as just after printing were expressed by .

EXAMPLE 1

The polyester resin A for a dye receiving layer was diluted with a mixed solvent of toluene:methyl ethyl ketone=50:50 into a 20% solution. To this solution was added epoxy-modified silicone oil (KF-102, manufactured by Shin-Etsu Chemical Co. Ltd.) in a proportion of 10% by weight relative to said resin, and the mixture was applied on a 150 μm -thick synthetic paper (Yupo PPG-150, manufactured by Oji Yuka Co., Ltd. ) with a wire bar so that the thickness of dry coating became 4 μm. This sheet was dried at 120° C. for 30 minutes to form a dye-receiving layer (image receiving layer).

EXAMPLES 2–9

Using polyester resins B-I, dye-receiving layers were formed in the same manner as in Example 1, and used in Examples 2–9, respectively.

Comparative Example 1

Using polyester resin J, a dye-receiving layer was formed in the same manner as in Example 1, and used in Comparative Example 1.

Comparative Examples 2

Using polyester resin K, a dye-receiving layer was formed in the same manner as in Example 1, and used in Comparative Example 2.

TABLE I

| Polyester resin | Acid Components (molar ratio) | | | | | Glycol Components (molar ratio) | | | | Number Average Molecular Weight | Glass Transition Temperature (°C.) | Specific Gravity |
| --- | --- | --- | --- | --- | --- | --- | --- | --- | --- | --- | --- | --- |
|   | TPA | IPA | CHDA | SA | TMA | TCD | CHDM | EG | NPG |   |   |   |
| A | 50 | 50 |   |   |   | 50 |   | 50 |   | 21000 | 85 | 1.261 |
| B | 65 | 35 |   |   |   |   | 35 | 65 |   | 18000 | 70 | 1.283 |
| C | 60 | 40 |   |   |   | 20 | 20 | 60 |   | 21000 | 73 | 1.275 |
| D | 30 | 40 | 30 |   |   |   | 40 | 60 |   | 24000 | 53 | 1.261 |
| E | 50 | 45 |   | 5 |   | 50 |   | 25 | 25 | 17000 | 72 | 1.220 |
| F | 50 | 48 |   |   | 2 | 90 |   |   | 10 | 18000 | 95 | 1.215 |
| G | 50 | 48 |   |   | 2 | 50 |   |   | 50 | 18000 | 80 | 1.215 |
| H | 65 |   | 35 |   |   |   | 35 | 65 |   | 27000 | 55 | 1.252 |
| I | 65 |   | 35 |   |   |   | 35 | 65 |   | 5000 | 54 | 1.252 |
| J | 50 | 50 |   |   |   |   |   | 50 | 50 | 17500 | 65 | 1.260 |
| K | 20 | 20 | 20 | 40 |   | 90 |   |   | 10 | 18000 | 5 | 1.180 |

In Table 1, each abbreviation stands for the following.
TPA: terephthalic acid IPA: isophthalic acid
CHDA: cyclohexanedicarboxylic acid
SA: sebacic acid TMA: trimellitic acid
TCD: tricyclodecanedimethylol (TCD-Alkohol DM ®)
CHDM: cycloliexanedimethylol EG: ethylene glycol
NPG: neopentyl glycol

TABLE 2

| | Print density | Light-resistance (%) | Resistance to plasticizer | Resistance to finger print | Heat resistance (%) | Image preservation |
| --- | --- | --- | --- | --- | --- | --- |
| Ex. 1 | 2.2 | 93 | ○ | ○ | 98 | ○ |
| Ex. 2 | 2.3 | 90 | ○ | ○ | 98 | ○ |
| Ex. 3 | 2.2 | 91 | ○ | ○ | 96 | ○ |
| Ex. 4 | 2.5 | 90 | ○ | ○ | 91 | ○ |
| Ex. 5 | 2.4 | 94 | Δ | Δ | 99 | ○ |
| Ex. 6 | 2.3 | 94 | ○ | ○ | 100 | ○ |
| Ex. 7 | 2.2 | 93 | ○ | ○ | 98 | ○ |
| Ex. 8 | 2.3 | 95 | ○ | ○ | 98 | ○ |
| Ex. 9 | 2.3 | 94 | ○ | ○ | 94 | ○ |
| Com. Ex. 1 | 1.8 | 65 | × | × | 80 | ○ |
| Com. Ex. 2 | 2.3 | 80 | Δ | Δ | 80 | × |

As is evident from Table 2, an image receiving material comprising the dye-receiving resin of the present invention as a dye-receiving resin for the image receiving layer (dye-receiving layer) exhibits high dye-receiving sensitivity, high light-resistance to resistance to plasticizer, finger prints, and heat, and superior durability and preservation of images.

Possibility of Industrial Utilization

Since the image receiving layer of sublimation thermosensible recording paper containing, as a main component, a polyester resin of the present invention comprising alicyclic component exhibits high dye-receiving sensitivity, and the images transferred have light-resistance, resistance to plasticizer, resistance to finger prints, and so on, which afford superior durability and preservation stability of images, it can provide a sublimation thermosensible recording paper having a variety of superior properties which have not been obtained heretofore, and is industrially useful.

What is claimed is:

1. A sublimation transfer image receiving material comprising a base material and a dye-receiving layer, said dye-receiving layer comprising a lubricant and a polyester resin comprising an aromatic dicarboxylic acid component and a glycol component comprising an alicyclic glycol component.

2. The material according to claim 1, wherein the alicyclic glycol component of the polyester resin is comprised of a tricylcodecane component or/and a cyclohexane component.

3. The material according to claim 1, wherein the polyester resin further comprises an alicyclic dicarboxylic acid component.

4. The material according to claim 1, wherein said lubricant is selected from the group consisting of fluororesins, silicone resins, organic carboxylate compounds, and mixtures thereof.

5. The material according to claim 3, wherein the aromatic dicarboxylic acid component is at least 60 mol % of the total acid component mol %.

6. The material according to claim 5, wherein the alicyclic glycol component is at least 20 mol % of the total glycol component mol %

7. The material according to claim 6, wherein the $T_g$ of the polyester ranges from 40° C. to 120° C.

8. A method for obtaining printed images comprising contacting a dye-receiving layer of a sublimation transfer image receiving material with a thermal dye transfer sheet which includes a dye and heating the material and sheet so that the dye in the transfer sheet is transferred to the dye-receiving layer, wherein the dye-receiving layer comprises a polyester resin comprising an aromatic dicarboxylic acid component and a glycol component comprising an alicyclic glycol component.

9. The method according to claim 8, wherein the polyester resin further comprises an alicyclic dicarboxylic acid component.

10. The method according to claim 9, wherein the aromatic dicarboxylic acid component is at least 60 mol % of the total acid component mol %.

11. The method according to claim 10, wherein the alicyclic glycol component is at least 20 mol % of the total glycol component mol %.

12. The method according to claim 11, wherein the $T_g$ of the polyester ranges from 40° C. to 120° C.

13. The method according to claim 8, wherein the material further comprises a lubricant.

14. The method according to claim 8, wherein the dye-receiving layer further comprises a lubricant.

15. The method according to claim 12, wherein the aromatic dicarboxylic acid component is at least 60 mol % of the total acid component mol % and the alicyclic glycol component is at least 20 mol % of the total glycol component mol %.

16. An assemblage for obtaining printed images comprising (a) a dye-receiving layer of a sublimation transfer image receiving material and (b) a thermal dye transfer sheet which includes a dye that is transferred to the dye-receiving layer when the layer is superimposed on the transfer sheet after exposure thereof, wherein the dye-receiving layer comprises a polyester resin comprising an aromatic dicarboxylic acid component and a glycol component comprising an alicyclic glycol component.

17. The assemblage according to claim 16, wherein the polyester resin further comprises an alicyclic dicarboxylic acid component.

18. The assemblage according to claim 17, wherein the aromatic dicarboxylic acid component is at least 60 mol % of the total acid component mol %.

19. The assemblage according to claim 18, wherein the alicyclic glycol component is at least 20 mol % of the total glycol component mol %.

20. The assemblage according to claim 19, wherein the $T_g$ of the polyester ranges from 40° C. to 120° C.

21. The assemblage according to claim 16, wherein the material further comprises a lubricant.

22. The assemblage according to claim 16, wherein the dye-receiving layer further comprises a lubricant.

* * * * *

UNITED STATES PATENT AND TRADEMARK OFFICE
CERTIFICATE OF CORRECTION

PATENT NO. : 5,389,493
DATED : February 14, 1995
INVENTOR(S) : Asai et al.

It is certified that error appears in the above-identified patent and that said Letters Patent is hereby corrected as shown below:

In Column 1, line 14: "For" should read --for--.
In Column 2, line 5: "sebaeic" should read --sebacic--.
In Column 2, line 13: "titan" should read --than--.
In Column 4, line 49: "by ," should read --by O,--.
In Column 4, line 63: "by ," should read --by O,--.
In Column 5, line 9: "by ." should read --by O.--.
In Column 6, line 19: "to resistance to" should read --, high resistance to--.
In Column 6, line 36: "sublimination" should read --sublimation--.
In Column 7, line 17: "sublimination" should read --sublimation--.
In Column 8, line 11: "sublimination" should read --sublimation--.

Signed and Sealed this

First Day of July, 1997

Attest:

BRUCE LEHMAN

Attesting Officer

Commissioner of Patents and Trademarks